UNITED STATES PATENT OFFICE.

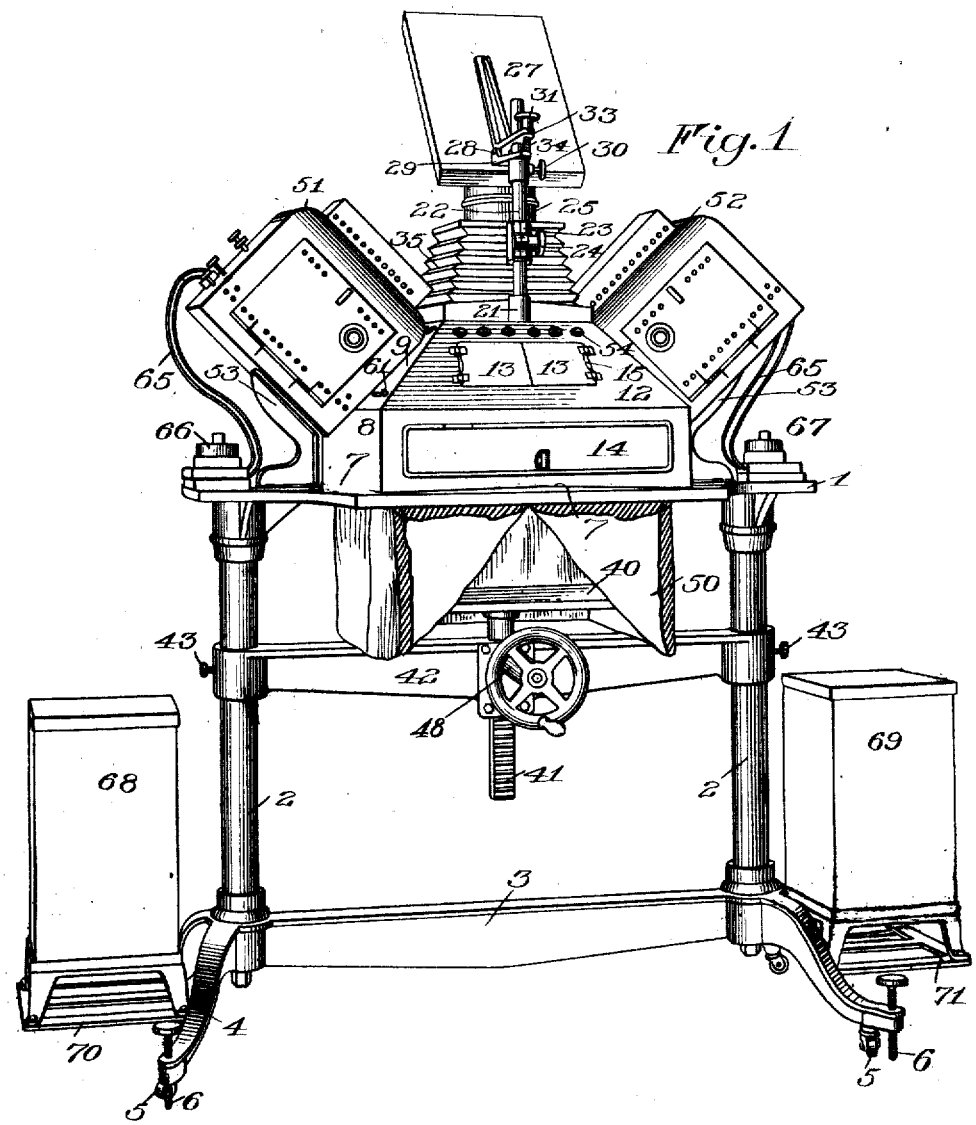

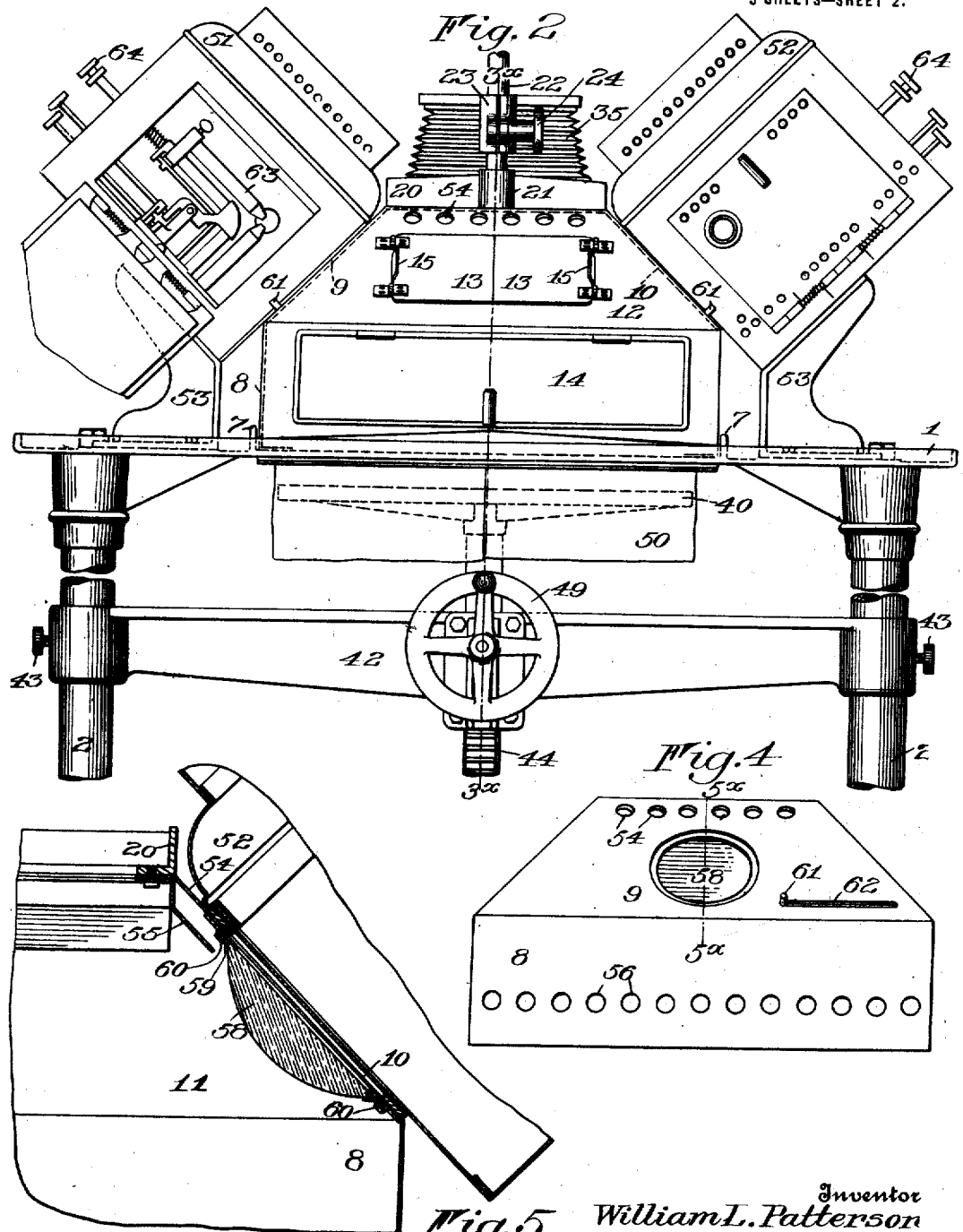

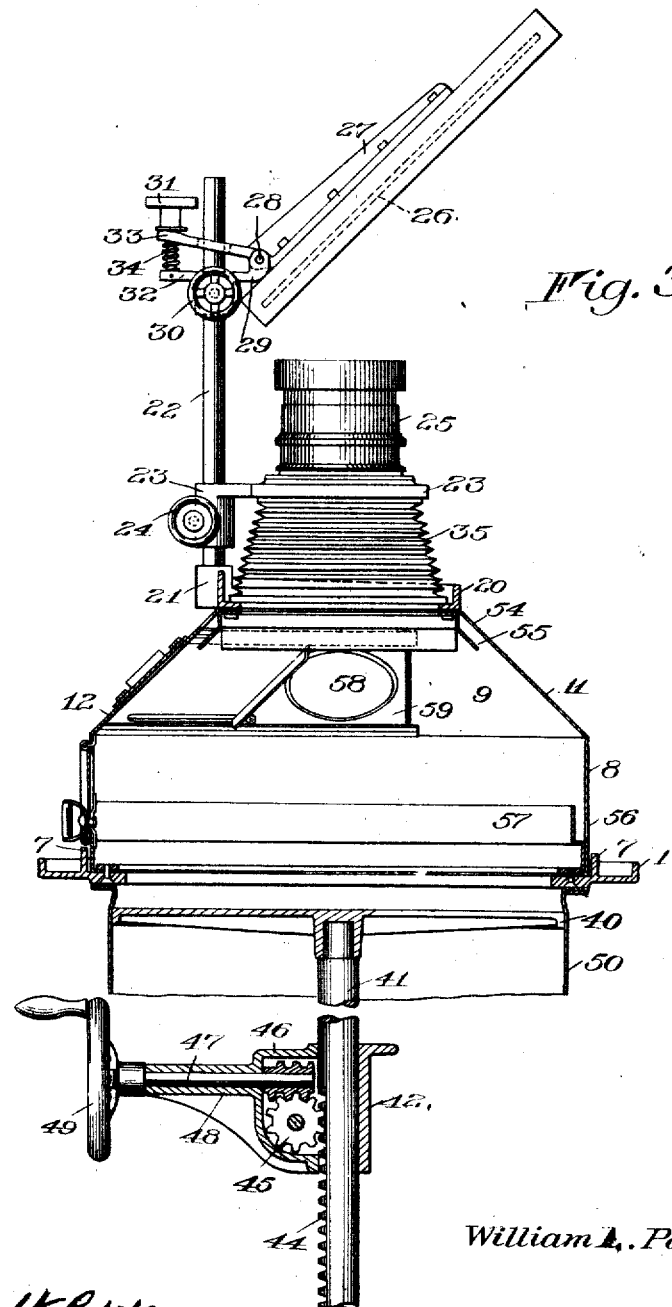

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

APPARATUS FOR THE PROJECTION OF IMAGES OF LARGE OPAQUE OBJECTS.

1,202,754.　　　Specification of Letters Patent.　　Patented Oct. 24, 1916.

Application filed May 5, 1913. Serial No. 765,459.

*To all whom it may concern:*

Be it known that I, WILLIAM L. PATTERSON, of Rochester, in the county of Monroe and State of New York, have invented certain new and useful Improvements in Apparatus for the Projection of Images of Large Opaque Objects; and I do hereby declare the following to be a full, clear, and exact description of the same, reference being had to the accompanying drawings, forming a part of this specification, and to the reference numerals marked thereon.

My present invention has for its object to provide a projection apparatus adapted particularly to be used for throwing on the screen enlarged images of opaque objects which in themselves are of large area, and it comprehends a horizontal support adapted to receive the objects which is adjustable relatively to the focal plane of the projection lenses and the arrangement of a plurality of illuminating elements or lanterns positioned above the support and arranged to illuminate the object so as to eliminate shadows thereon.

To these and other ends the invention consists in certain improvements and combinations of parts all as will be hereinafter more fully described, the novel features being pointed out in the claims at the end of the specification.

In the drawings, Figure 1 is a perspective view of a projection apparatus constructed in accordance with my invention; Fig. 2 is an enlarged front elevation of the dark chamber and associated parts; Fig. 3 is a cross sectional view taken on the line 3ˣ—3ˣ of Fig. 2; Fig. 4 is a detail side view of the dark chamber casing, and Fig. 5 is an enlarged sectional view taken on the line 5ˣ—5ˣ of Fig. 4, showing the forward end of one of the lantern housings and the mounting of the adjustable condenser.

Similar reference numerals in the several figures indicate the same parts.

Projection apparatus embodying my present invention is intended to be used in the projection of images of opaque objects having a surface area of upward of twenty inches square, as examples of which I would mention large advertisement sheets, placards, architectural drawings, or maps as well as mechanical objects, such as parts of machines. In this connection the apparatus possesses a distinct advantage especially when the mechanism is of complicated structure, as all of the parts are shown in their natural form and coloring in the greatly enlarged images.

The apparatus preferably comprises a frame or standard having a top 1 supported at the ends upon uprights or columns 2, mounted on a suitable base 3, having at each end the laterally diverging pairs of legs 4—4, supported on wheels or casters 5 which facilitate the adjustment of the projection apparatus relatively to the screen on which images are to be thrown. Each leg is also provided with an anchoring device such as the screw 6 provided with hand wheels by which they may be adjusted into contact with the floor to prevent the accidental displacement of the apparatus after it has been moved into the desired position. The table top 1 is preferably a metal casting having a central portion wider than its ends and provided with a rectangular aperture bordered on its four sides by upwardly extending ribs or projections 7, forming a seat within which is held the casing forming the dark chamber 8. The latter is preferably rectangular in outline, its lower portion being formed by vertical walls surmounted by the frusto-pyramidal top portion formed by the angularly disposed walls 9 and 10 and the front and rear walls 11 and 12. The rear wall 12 is preferably provided with two doors 13—13 and the vertical wall of the casing below it is also provided with a door 14, said doors being capable of opening outwardly. The aperture covered by the lower door is the larger, and serves as means whereby certain objects may be placed within the chamber while the doors 13 permit the operator to view the adjustment of the objects on the support. The doors 13 are each provided with a small flange or projection 15 between their hinges whereby they are only permitted a limited opening movement into a plane that is substantially at right angles to the wall 12.

Mounted on the top of the dark chamber and surrounding the opening therein is a rectangular metal frame 20 provided on its rear side with a boss 21 forming a socket in which is seated a vertically extending guide rod 22, carrying the support or standard 23 which is clamped in adjusted position by the hand wheel 24 and carries the system of projection lenses, indicated by 25. In axial alinement with the latter, and also adjustable vertically on the rod 22, is the reflector 26 for deflecting the rays of light emitted from the lens system in a horizontal direction and erecting the image. This reflector is mounted on a suitable frame 27, pivoted at 28 to a sliding member 29 adjustably secured to the rod 22 by the screw 30. Angular adjustment of the reflector 26 relatively to the axis of the pencil of light rays is accomplished by the adjusting screw 31 passing through an extension 32 on the member 29 and engaging the end of a finger 33 on the frame 27, the latter being normally moved in one direction by a spring 34. Between the top of the dark chamber and the support 23 is a bellows 35, the ends of which are secured to said parts.

The support for the objects of which images are to be projected on the screen, comprises a platform 40 mounted on a centrally disposed shaft 41 guided on the cross piece 42 of the supporting frame, which latter is also adjustable vertically on the end standards or columns 2—2 and held in the desired position thereon by set screws 43. The shaft 41 is provided with gear teeth 44 coöperating with the gear wheel 45, rotated by the worm 46 on the shaft 47, journaled in a bracket extension 48 of the cross piece 42 and fitted at its outer end with an operating hand wheel 49 which is located substantially in the plane of the rear edge of the table top 1, where it is within convenient reach of the operator. A flexible opaque cloth 50 depends, in the form of a mantle, about the four sides of the support 40, completely inclosing the latter and serving as a wall which extends the confines of the dark chamber. This cloth is attached to the underside of the support 1 by any suitable form of fastening devices and it is preferably arranged so that its meeting edges overlap at the rear side of said support, and being unconnected, facilitates the displacing of the rear panel of the drapery when applying objects to, or removing them from the support.

In the use of an apparatus of this character, it is particularly important that the object be illuminated in such a way as to avoid the formation of shadows and be illumined with light of equal intensity over the entire surface, especially when the object has a superficial area of upward of 20 inches square. To this end, I employ a plurality of illuminating elements or lanterns; in the present instance, two such lanterns being illustrated and disposed to direct the rays of light emanating from them in a plane inclined at an angle of substantially forty-five degrees to the point of intersection of the axis of the lens system and the plane of the aperture in the table top 1. It is for the purpose of facilitating this arrangement of the lanterns that the top portion of the dark chamber is made pyramidal, as this shape provides the converging sides 9 and 10 disposed relatively to each other at an angle of 90 degrees. Each of the two lanterns indicated by 51 and 52, is mounted in the inclined position delineated, on a suitable bracket 53, secured to the support 1 and held in the desired position independently of the dark chamber and in juxtaposition thereto, so that a light tight engagement is maintained between the front of the lantern housing and the adjacent wall of said chamber. The latter is provided around its upper edge with ventilating apertures 54 through which the escape of light is prevented from the interior by a flange 55 and similar apertures 56 are also arranged in the vertical ends and front wall of the chamber, which are covered by a spaced flange 57, as shown in Fig. 3.

The lanterns being disposed in the manner described permits the direct illumination of objects without the use of the usual condensers, but if it is desired to employ these, or to use them for intensifying the illumination of parts of objects, suitable lenses may be provided, as indicated by 58, mounted in slides 59, movable in guides 60 on the undersides of the walls 9 and 10, and adjustable laterally into and out of register with the apertures provided therein by means of an operating projection or handle 61 on the slide 59 projecting exteriorly of the casing through the slots 62.

Any desired form of illuminating elements may be provided in the lanterns 51 and 52 and in one of these I have shown an arc lamp comprising the adjustable carbons 63, disposed at right angles to each other, which may be manipulated by adjusting devices 64, exteriorly of the lantern housings 51 and 52. The general structure of the apparatus is designed with particular reference to using arc lamps so that these may be readily controlled by the operator and for this reason I carry the circuit wires 65 into the switch boxes 66 and 67 which are permanently connected to the ends of the table top 1, the reduced ends of which are extended outwardly slightly beyond the columns 2—2 for the accommodation of these switches. I also mount the separate rheostats 68 and 69, one for each lamp circuit, on separate brackets 70 and 71, projecting laterally from the two pairs of legs 4—4, an arrangement which results in great convenience to the operator, since all of those devices which it is necessary for him to supervise during the operation of the lanterns, are within convenient reach and mounted on one and the same support.

I claim as my invention:

1. In a projection apparatus, the combination with a frame piece, a dark chamber thereon comprising a bottom having vertical walls and a top comprising upwardly extending converging side walls and a system of projection lenses surmounting the dark chamber, of lanterns disposed in angular position and directing the light rays into opposite sides of the chamber and brackets on the frame supporting the lanterns.

2. In a projection apparatus, the combination with a frame piece, a dark chamber thereon having a rectangular base and a pyramidal top, and a system of projection lenses above said top, of two lanterns disposed on opposite walls of the top of the chamber and separate brackets on the frame piece supporting the lanterns in angular position thereon.

3. In a projection apparatus, the combination with a frame piece provided with an aperture and having a surrounding flange spaced from the edge of the aperture, a dark chamber having side walls resting on the frame within the flange and a collar mounted on the top of the dark chamber having a surrounding flange, of a system of lenses supported on the collar, a bellows extending between said parts and having its lower end secured within said flange, means for illuminating the interior of the chamber and a support for objects located beneath the aperture of the frame piece.

4. In a projection apparatus, the combination with a frame piece, having an aperture, a rectangular dark chamber having vertical side walls and converging top walls and a system of projection lenses surmounting the chamber, of an object support movable relatively to the aperture in the frame piece and a plurality of lanterns for illuminating objects placed upon said support.

5. In a projection apparatus, the combination with a frame having an upright at each end and a horizontally disposed apertured frame piece thereon, a system of projection lenses arranged centrally above the aperture in the frame and a dark chamber casing surrounding the latter and disposed between the frame piece and lenses, of a cross piece adjustable vertically on the uprights, an object platform independently adjustable on said cross piece relatively to the frame piece and a lantern mounted on the latter and disposed to illuminate objects on the platform.

WILLIAM L. PATTERSON.

Witnesses:
 RUSSELL B. GRIFFITH,
 H. E. STONEBRAKER.